United States Patent [19]

Someya et al.

[11] Patent Number: 5,698,832
[45] Date of Patent: Dec. 16, 1997

[54] MAGNETIC CARD READING APPARATUS

[75] Inventors: Hidenobu Someya, Noda; Takashi Sagawa, Urayasu; Tsuneo Izumi, Inagi, all of Japan

[73] Assignee: Neuron Corporation, Tokyo, Japan

[21] Appl. No.: 808,960

[22] Filed: Feb. 19, 1997

Related U.S. Application Data

[63] Continuation of Ser. No. 416,330, Apr. 4, 1995, abandoned.

[51] Int. Cl.$^6$ .................................................. G06K 7/08
[52] U.S. Cl. .......................... 235/449; 235/38; 235/475
[58] Field of Search ................................ 235/475, 449, 235/380; 902/8, 25, 27, 30, 31

[56] References Cited

U.S. PATENT DOCUMENTS

| | | | |
|---|---|---|---|
| 3,575,271 | 4/1971 | Constable | 902/31 |
| 3,946,204 | 3/1976 | Taniguchi | 235/435 |
| 3,957,173 | 5/1976 | Roudebush | 221/15 |
| 4,510,381 | 4/1985 | Fukatsu | 235/379 |
| 4,518,852 | 5/1985 | Stockburger | 235/381 |
| 4,608,486 | 8/1986 | Berstein | 235/380 |
| 4,612,864 | 9/1986 | Beck | 109/49.5 |
| 4,795,896 | 1/1989 | Prell | 235/482 |
| 4,803,349 | 2/1989 | Sugimoto | 235/475 |
| 5,434,404 | 7/1995 | Liu | 235/475 |

*Primary Examiner*—Donald T. Hajec
*Assistant Examiner*—Karl D. Frech
*Attorney, Agent, or Firm*—Sughrue,Mion,Zinn,Macpeak & Seas, PLLC

[57] ABSTRACT

A magnetic card reading apparatus particularly for an automatic vending machine which is located in a severe environmental condition comprises a main structure and an outer structure. The main structure has a magnetic card accommodation unit adapted to accommodate a magnetic card to a predetermined position and provided with a magnetic card insertion port and a magnetic card accommodation portion communicated with the magnetic card insertion port. A magnetic head is provided for the magnetic card accommodation unit for reading out a magnetic information recorded on the magnetic card held at the predetermined position. An electronic circuit unit is provided for the magnetic card accommodation unit for processing a signal concerning the information read out by and transmitted from the magnetic head. A shutout block member is also provided for the magnetic card accommodation unit for shutting out a foreign material which has invaded through the outer structure and then through the magnetic card accommodation unit thereby to prevent the foreign material from reaching the electronic circuit unit.

34 Claims, 10 Drawing Sheets

PRIOR ART

MAGNETIC CARD READING APPARATUS

This is a Continuation of application Ser. No. 08/416,330 filed Apr. 4, 1995 now abandoned.

BACKGROUND OF THE INVENTION

The present invention relates to a magnetic card reading apparatus, and, more particularly, to a magnetic card reader having a structure for preventing foreign material such as water, snow, fog, gasoline or the like liquid substance or dust from invading into an inner portion of the magnetic card reader in which electrical equipment is arranged.

Recently, there have been known various devices or apparatus for which magnetic cards are utilized. Such devices or apparatus are generally called card readers, in which a magnetic card is inserted, information recorded on the magnetic card is read out and a record signal is then transmitted. In response to this signal, electrical equipment mounted in the card reader is operated.

In a known manually handling type magnetic card reader, a magnetic card inserted into the interior of the magnetic card reader through a card insertion port is accommodated in a predetermined position in a card accommodation portion continuous to the card insertion port, at which a magnetic information recorded on the card is read out and a record signal is generated, which is then read out by a magnetic head.

The manually handling type magnetic card reader of the character described above generally involves the following three types of structures.

(1) A card reader has a main structure and an outer structure, the main structure being provided with a metallic rigid body supporting a magnetic head, a card insertion port, a card accommodation portion, a light switch means for confirming the insertion of the magnetic card and an electronic circuit substrate. The magnetic head is supported by the metallic rigid body and moves substantially perpendicularly to a plane of the magnetic card.

(2) A card reader has a magnetic head which is disposed in front of a main structure by about several cm in order to transmit a record signal at a time when a magnetic card is inserted into the main structure through a card insertion port. It is also required for the magnetic head to be movable by a minute distance while receiving a pre-load in accordance with an irregular surface shape of the magnetic card, and the magnetic head is fixed to a front end portion of the metallic rigid body extending further from the main structure. The metallic rigid body is disposed to be vertically movable on the main structure while receiving the pre-load.

(3) A card reader has a main structure having a card insertion port and a card accommodation portion which is continuous to the insertion port and in which a magnetic card is reciprocally movable in a predetermined space.

One example of a conventional magnetic card reader will be explained hereunder with reference to FIG. 15.

A card reader of this example comprises a main structure 101 and an outer structure 104, the main structure 101 having a card accommodation portion 102 for accommodating a magnetic card 103 shown by dotted lines. FIG. 15 shows a state wherein the magnetic card 103 is deeply inserted into the card accommodation portion 102. The main structure 101 is further provided with a magnetic head 106 and a metallic rigid body 107 supporting the magnetic head 106. On the other hand, the outer structure 104 is formed with a guide groove 105 for guiding the magnetic card 103, and the guide groove 105 is forwardly widened for ready insertion of the magnetic card 103.

When the main structure 101 and the outer structure 104 are assembled together, the main structure 101 is fitted into a hole, i.e. slit, 110 formed to the outer structure 104 and a magnetic head 106 supported by the metallic rigid member 107 is inserted into a receiving portion 112 communicated with an inlet port 111 of the outer structure 104. According to this structure, it will be said that the magnetic head 106 is protected by the outer structure 104. The outer structure 104 has projecting pieces 113 each having a forked front end, as a recessed hole, into which a side member 114 of the main structure 101 is fitted. The side member 114 is formed with a hole 114a which is mated with the recess 113a after the fitting of the side member 114 and they are then fastened together by means of a bolt, for example, whereby the side member 114 of the main structure 101 is fixed to the projecting piece 113 of the outer structure 104.

The metallic rigid member 107 supporting the magnetic head 106 is positioned above the main structure 101 and the rigid member 107 is slightly movable vertically with a pin 108 being a support point for this movement. The rigid member 107 is always preloaded downward in an assembled state by means of a rod spring 109.

Referring to FIG. 15, when the magnetic card 103 is inserted into the card accommodation portion 102 as shown by dotted lines, the magnetic head 106 is pressed on a magnetic stripe 103a of the magnetic card 103. In this state, the magnetic card 103 may be bent by the urging force of the spring 109, but, by assembling the main structure 101 with the outer structure 104, the magnetic card 103 is straightly inserted in or drawn out from the accommodation portion 102, and in substitution, the magnetic head 106 is pushed up while applying the pre-load to the magnetic card 103, thus the metallic rigid member 107 being slightly moved vertically.

A light sensor 115 is provided for the rear portion 101a of the main structure 101, which generally comprises a light emitting diode 116 and a light receiving diode 117, and when the magnetic card 103 is completely inserted into the accommodation portion 102, the light transmission between these diodes 116 and 117 are shut out. By detecting this fact, it is detected whether the magnetic card 103 is inserted completely or not into the accommodation portion 102. In a general structure, the rear portion 101a of the main structure is formed with a hole in which the light emitting diode 116 and the light receiving diode 117 are disposed in an opposing manner. The wiring of the light sensor 115 and a lead wire from the magnetic head are connected to the electronic circuit substrate 118, which is fixedly mounted to the upper portion of the main structure 101.

In a case where a conventional manual card reader of the structure described above is disposed to and utilized at an outdoor portion which may be adversely impacted from rain, snow or other weather conditions, the following problems arise.

When the manual card reader such as shown in FIG. 15 is disposed at a portion exposed to bad weather conditions such as rainy conditions, splashed water or splashed gasoline seeps into the magnetic card accommodation portion 102 through the guide groove 105 and then reaches the magnetic head 106 and the light sensor 115. Furthermore, since the magnetic head 106 reads the record signal through the direct contact with the magnetic card 103, the splashed water or gasoline which has seeped into the card accommodation portion 102 further flows to the electronic circuit substrate 118 through the rigid member 107, which may cause an electrical insulation deterioration. In addition, since the outer structure 104 has the inlet port 111 widely opened so that the metallic rigid member 107 is vertically movable, the possibility of invasion of the water or the like increases, which further results in the electrical insulation deterioration.

The rear portion 101a of the main structure 101 is provided with a penetrating hole in which the light emitting diode 116 and the light receiving diode 117 are disposed so as to oppose vertically to each other therein, so when the sensor 115 is soiled by foreign material such as rain water, gasoline splash, dust or the like, the sensor 115 must be disassembled to repair and clean the soiled portion.

Furthermore, according to the conventional structure of the manual card reader such as shown in FIG. 15, a card insertion test has to be done after assembling together the main structure 101 and the outer structure because when the magnetic card 103 is inserted into the main structure before the assembling thereof, the magnetic card 103 is bent downward by the pre-loading of the spring 109 as mentioned hereinbefore. Accordingly, in the conventional structure, it becomes necessary to carry out the magnetic card insertion test after assembling the main structure with the outer structure. That is, after the assembling, the magnetic card 103 is inserted into the card accommodation portion 102 of the main structure and the recorded information on the magnetic card 103 is then read out by the magnetic head 106. Therefore, much assembling process is required only for the card insertion test, which results in manufacturing cost increasing, thus providing a problem.

Furthermore, in general, a permalloy is exposed at a magnetic card contacting portion of the magnetic head 106, and in cases where the permalloy is rusted with water, gasoline or the like, it results in difficulty in reading out the recorded information signal of the magnetic card. In a case where the magnetic card reader is disposed in a cold area, invaded water may be frozen in the card accommodation portion 102 of the main structure, and in such a case, it becomes impossible to insert the magnetic card 103 into the card accommodation portion 102, and hence, the magnetic card reader itself does not attain its function.

SUMMARY OF THE INVENTION

An object of the present invention is to substantially eliminate defects or drawbacks encountered in the prior art described above and to provide a magnetic card reading apparatus particularly adapted to an automatic vending machine having a structure capable of preventing foreign substances such as liquid, dust or the like from invading into a portion of the magnetic card reading apparatus at which an electronic equipment is arranged and capable of accurately reading out an information recorded on the magnetic card.

The above and other objects can be achieved according to the present invention by providing a magnetic card reading apparatus comprising:

a main structure; and
an outer structure,
said main structure comprising:
 a magnetic card accommodation unit adapted to accommodate a magnetic card to a predetermined position and provided with a magnetic card insertion port and a magnetic card accommodation portion communicated with the magnetic card insertion port;
 a readout means provided for the magnetic card accommodation unit for reading out a magnetic information recorded on the magnetic card held at the predetermined position;
 an electronic circuit unit provided for the magnetic card accommodation unit for processing a signal concerning the information read out by and transmitted from the readout means; and
 a shutout means or sealing mechanism provided for the magnetic card accommodation unit for shutting out a foreign material invaded through the outer structure and then through the magnetic card accommodation unit and preventing the foreign material from reaching the electronic circuit unit.

In preferred embodiments, the magnetic card readout means is disposed in the vicinity of the magnetic card insertion port and is provided with a pressing means for pressing the readout means against the inserted magnetic card. The magnetic card readout means comprises a magnetic head having a portion contacting the magnetic card, the contacting portion being formed with a thin titanium plate.

The shutout means comprises a wall portion fastenable to the outer structure and a seal member adapted to seal the electronic circuit unit of the main structure. The seal portion is formed from a rubber seal plate.

The magnetic card accommodation unit has a main body provided with a front portion to which the magnetic record readout means is mounted, a rear portion to which the electronic circuit unit is mounted and a flanged portion constructed as a wall member portion common to a wall portion of the shutout means.

The main structure further comprises a discriminating means for discriminating a fact that the magnetic card is completely accommodated in a predetermined position of the magnetic card accommodation unit and a block means for accommodating the discriminating means and blocking the foreign material invaded into the magnetic card reading apparatus through the magnetic card insertion port from reaching the discriminating means. The discriminating means and the block means are disposed at a rear end portion of a magnetic card accommodation portion of the magnetic card accommodation unit. The discriminating means comprises a light emitting element, a light receiving element and a light shielding element. The block means has a vessel structure adapted to accommodate the discriminating means and is made of a light transmissive material.

The outer structure is a protector cover member which is attached to the main structure for covering the same and which comprises an opening port communicated with the magnetic card insertion port and a portion covering a front end portion of the magnetic card accommodation unit.

The magnetic card insertion port is directed obliquely upward with an inclination from a horizontal plane or substantially perpendicularly upward with respect to the horizontal plane.

In further preferred embodiments, a drain means is connected to the magnetic card accommodation unit to drain liquid substance which has seeped thereinto outside the apparatus. A heating means is provided for the magnetic card accommodation unit to heat the same, and the magnetic card accommodation unit is formed of a material having a good thermal conductivity.

The magnetic card accommodation unit may be further provided with a driving mechanism adapted to pull the magnetic card into the magnetic card accommodation unit through the insertion port, to locate the magnetic card to a predetermined position in the magnetic card accommodation unit and to discharge the magnetic card in the magnetic card accommodation unit outside the same through the insertion port.

According to the structure and characteristics of the present invention described above by way of preferred embodiments, since the shutout means is provided for the magnetic card accommodation unit, foreign material such as liquid substance seeping into the reading apparatus through the outside of the magnetic card accommodation unit can be prevented from reaching the electronic circuit unit, thus preventing the same from being damaged, and hence, accurately reading out the magnetic information recorded on the magnetic card.

Since the magnetic card read out means comprised of the magnetic head is pressed against the front surface of the magnetic card inserted into the magnetic card readout means, the magnetic information recorded on the front surface thereof can be accurately read out. The magnetic head has a surface contacting the magnetic card and this portion may be coated with or formed of a thin titanium plate, the magnetic head can be improved in its corrosion resisting property and wear resisting property.

The complete insertion of the magnetic card into the predetermined position of the magnetic card accommodation unit can be detected by the discriminating means, which is accommodated in the block means in the shape of a vessel, thus preventing the foreign material from reaching the discriminating means.

When a liquid substance seeps into the accommodation unit, the liquid substance is discharged positively outside the reading apparatus through the discharge means such as a hose. When the reading apparatus is disposed in a cold area, the heating means may be disposed to the reading apparatus to prevent the liquid substance which has seeped into the card accommodation unit, preferably formed of a material having a good thermal conductivity, from being frozen.

According to the present invention, the insertion port for the magnetic card can be directed upward or provided at any portion of the outer structure of the automatic vending machine, for example, so as to be acessible to users having different heights and be usable even by children or handicapped persons, or persons sitting in vehicles.

The magnetic card inserting, reading and discharging operations can be automatically performed by a driving mechanism according to one embodiment of the present invention.

Since the magnetic card readout means such as magnetic head and the electronic circuit unit can be electrically isolated by the wall portion of the shutout means, the electrical insulation between these elements can be maintained.

The further nature and features of the present invention can be made more clear from the following descriptions by way of preferred embodiments with reference to the accompanying drawings.

DESCRIPTION OF THE PREFERRED EMBODIMENTS

Preferred embodiments of the present invention will be described hereunder with reference to the accompanying drawings.

A first embodiment is described with reference to FIGS. 1 to 7.

Figure 1:
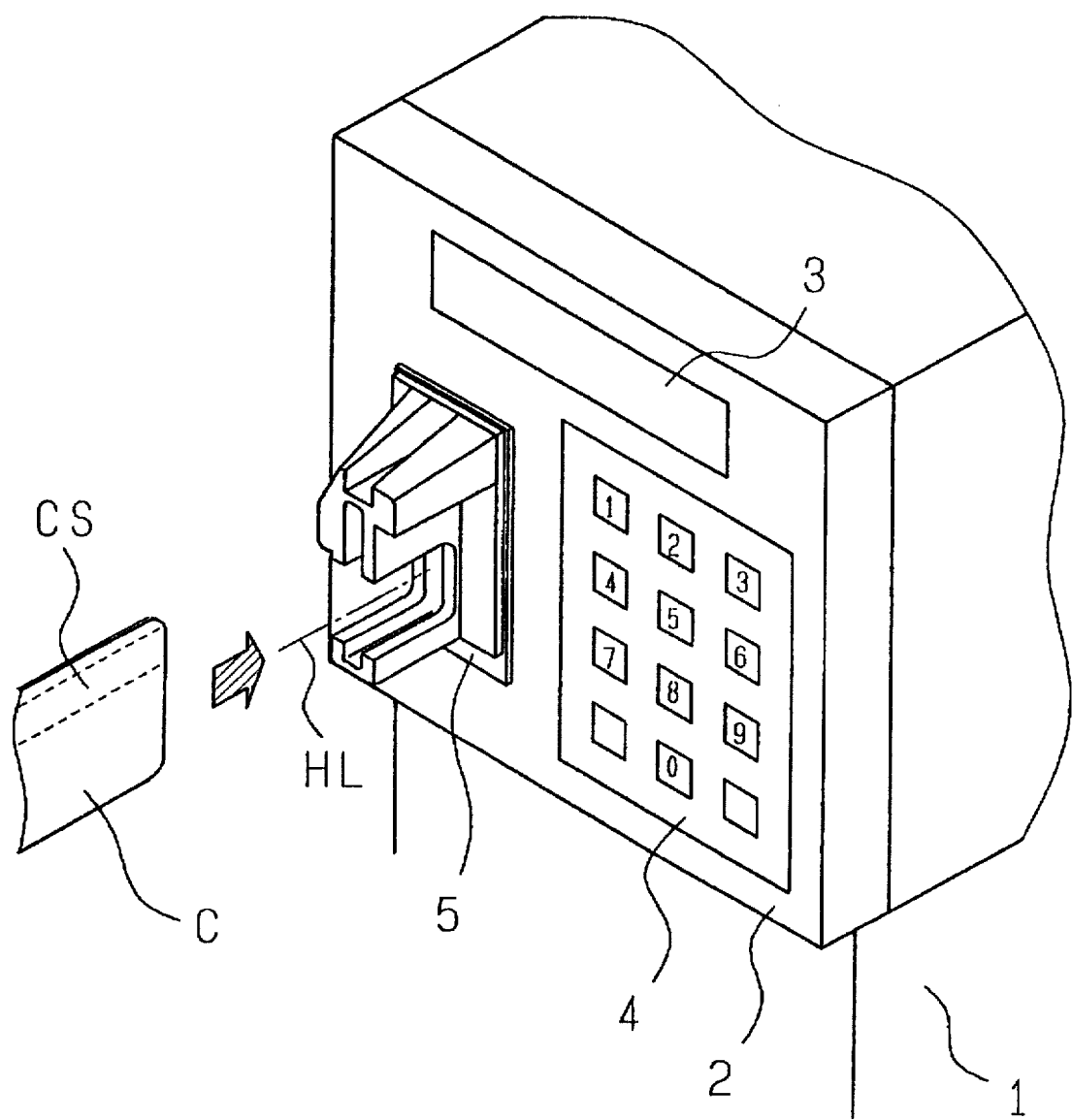
FIG. 1 is a perspective view of a portion of an automatic vending machine to which a magnetic card reader according to first embodiment of the present invention is mounted.

FIG. 1 is a perspective view of a front portion of an automatic vending machine, in a gasoline station, for example, provided with a magnetic card reader of a preferred embodiment according to the present invention. Referring to FIG. 1, an operation panel 2 provided for the front portion of the automatic vending machine 1 is provided with a display 3 displaying a gasoline amount or charge, a ten key board 4 and an entrance portion of a magnetic card reader 5. A person who wants to be supplied with gasoline pushes the ten key board to set the desired gasoline amount. When a magnetic card C is inserted into the entrance of the magnetic card reader 5, the magnetic card reader 5 reads out information regarding the name of the person and the like magnetically recorded on the magnetic card 5 in shape of magnetic stripe CS and identifies the same.

Figure 2:
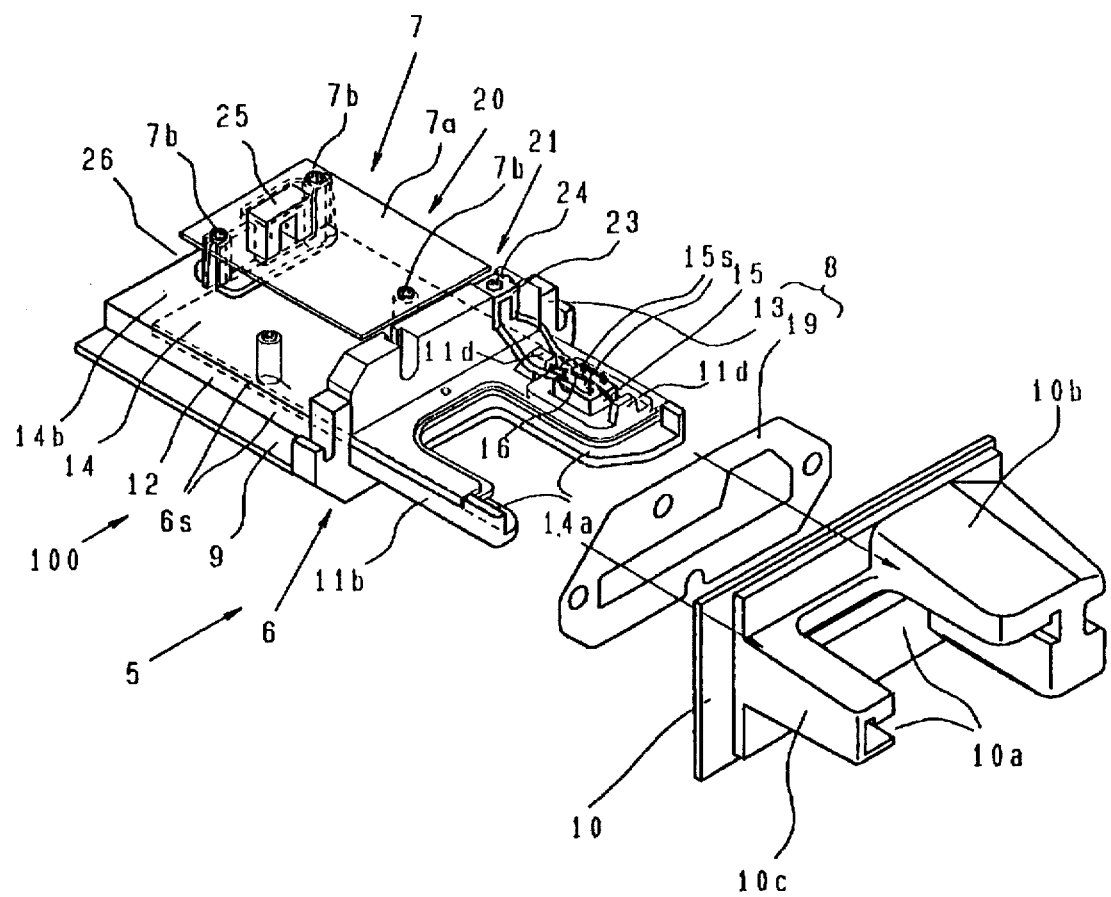
FIG. 2 is a developed perspective view of the magnetic card reader of the first embodiment of FIG. 1.

FIG. 2 is a developed perspective view of the structure of the magnetic card reader 5, which generally comprises a main structure 100 and an outer structure as a protector cover member 10 to be mounted to the main structure 100.

The main structure 100 comprises a card accommodation unit 6, an electronic circuit unit 7, a magnetic head 15 for reading out magnetic information recorded on the magnetic card, a shutout block structure 8, a discriminating means 25, a block means 26 and so on. The magnetic card accommodation unit 6 is provided with a main body 9 to which the protector cover member 10 is detachably mounted. The main body 9 of the accommodation unit 6 is formed of a material such as plastic material having a good heat conductivity and integrally with its front portion 11, rear portion 12 and a flanged portion 13 constituting a common wall portion of the shutout block structure sealing mechanism 8. The electronic circuit unit 7 includes a circuit substrate 7a detachably secured to the main body 9 by means of screws 7b, 7b, for example. Various electronic parts are mounted on the circuit substrate 7a.

An accommodation portion or guide 14 for guiding the insertion of the magnetic card C in the card reader is formed throughout the front portion 11, the rear portion 12 and the flanged portion 13 of the main body 9 of the magnetic card accommodation unit 6, as shown in FIG. 2 by dotted lines. The accommodation portion 14 is continuous to the insertion port 14a of the front portion 11, which is in turn is connected to the inlet port 10a of the protector cover member 10. The insert port 14a and the inlet port 10a are both formed substantially in U-shape for ready insertion of the magnetic card C. The width of the insertion port 14a is determined to be approximately twice the thickness of the magnetic card C and the length thereof is approximately the same as the short side width of the magnetic card C. The accommodation portion 14 is linearly formed to a bottom portion 14b of the main body 9 as shown by the dotted lines, so that the magnetic card C can be smoothly linearly inserted or withdrawn. It is desired that the bottom portion 14b of the accommodation portion 14 provides a bag shape.

The protector cover member 10 has a portion 10b protruded for protecting a magnetic head mounting portion 11a of the front portion of the body 9 and also has a portion 10c protruded for protecting a portion 11b of the front portion 11 thereof. The magnetic head 15 is mounted on the portion 11a, and the magnetic head 15 constitutes a magnetic information read-out element for reading out magnetic information such as of the name of an owner of the magnetic card C recorded on the magnetic stripe CS of the card C.

Figure 3:
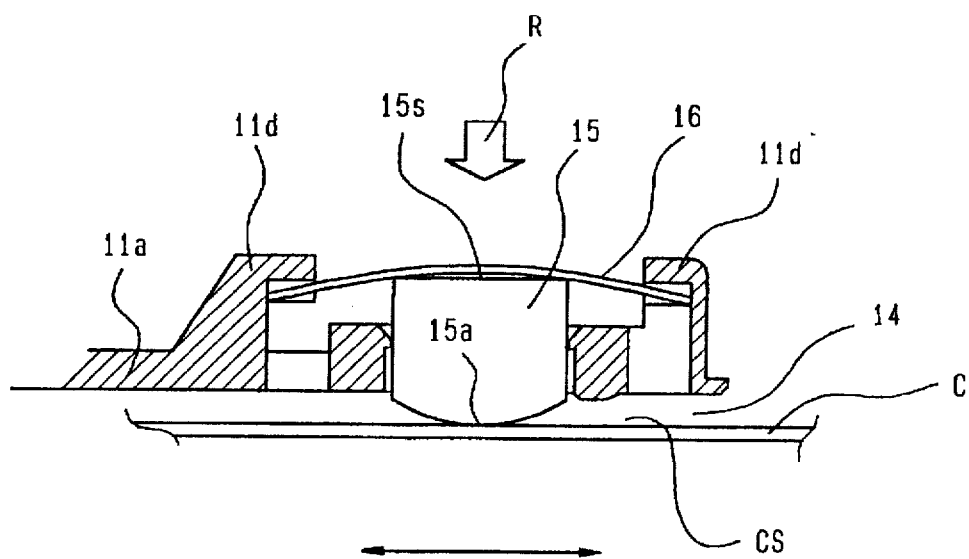
FIG. 3 is a view showing a structure of a magnetic head of the magnetic card reader of the first embodiment.

With reference to FIG. 3, the magnetic head mounting portion 11a is formed with two support members 11d, 11d, which are adapted to support both ends of an elastic member 16 as a metallic pressing means which urges the magnetic head 15 in an arrowed direction R.

According to this structure, a sliding surface 15a of the magnetic head 15 surely contacts the magnetic stripe CS of the inserted magnetic card C. That is, the elastic member 16, formed as a fine wire like member in this embodiment, pushes the magnetic head 15 to the magnetic card C accommodated in the accommodation portion 14 with the urging force of the elastic member 16. At this time, the magnetic head 15 is moved in a direction reverse to the direction R by the reaction force against the urging force of the elastic member 16, and the magnetic head 15 is hence subjected to a proper pressing force thereby to slide along the magnetic stripe CS of the magnetic card C. The magnetic head 15 used in the present embodiment is of an electromagnetic induction type structure or an MR (magnetic resistance) head, and a thin titanium film is applied on the sliding surface 15a having a gap of the magnetic head 15 for possibly preventing the magnetic head 15 from wearing and corroding. The sliding surface 15a of the magnetic head 15 projects into the accommodation portion 14 through the front portion 11 of the main body 9 and is press-contacted to the magnetic stripe CS of the magnetic card C inserted into the accommodation portion 14. Lead wires 15s, 15s extend from coils of the magnetic head 15.

The card reader of this embodiment is further provided with the shutout block structure 8, which will be described in detail hereunder.

The shutout block structure 8 is a member for preventing foreign materials such as rain water, gasoline, dust or the like from invading into an interior of the card reader, in which electronic circuit unit 7 and the like are arranged, from an outside portion of the protector cover member 10, that is, outside of the operation panel of FIG. 1. Thus, the shutout block structure 8 is a member for positively preventing the rain water, gasoline or the like from invading into the electronic circuit unit 7 from the outside of the card reader through the outer peripheral portion 6s of the magnetic card accommodation unit 6. The shutout block structure 8 has, as shown in FIG. 2, a wall member 13 and a seal member 19 as a gasket in the form of, for example, a rubber plate. The wall member 13 is fastened to the protector cover member 10 by means of screws, for example, and in the fastening time, the seal member 19 serves to water-tightly separate an inner space 20, in which the electronic circuit unit 7 is arranged, from the outside atmosphere thereby to prevent the foreign material such as liquid substance and dust from invading into the rear portion 12 of the main body 9 from the outside.

According to the embodiment of the present invention, the following techniques are applied in order to further water-tightly separate the front portion 11 and the rear portion 12 of the magnetic card accommodation unit 6 from each other and to prevent the invading of the foreign substances into the electronic circuit unit 7.

Figure 4:
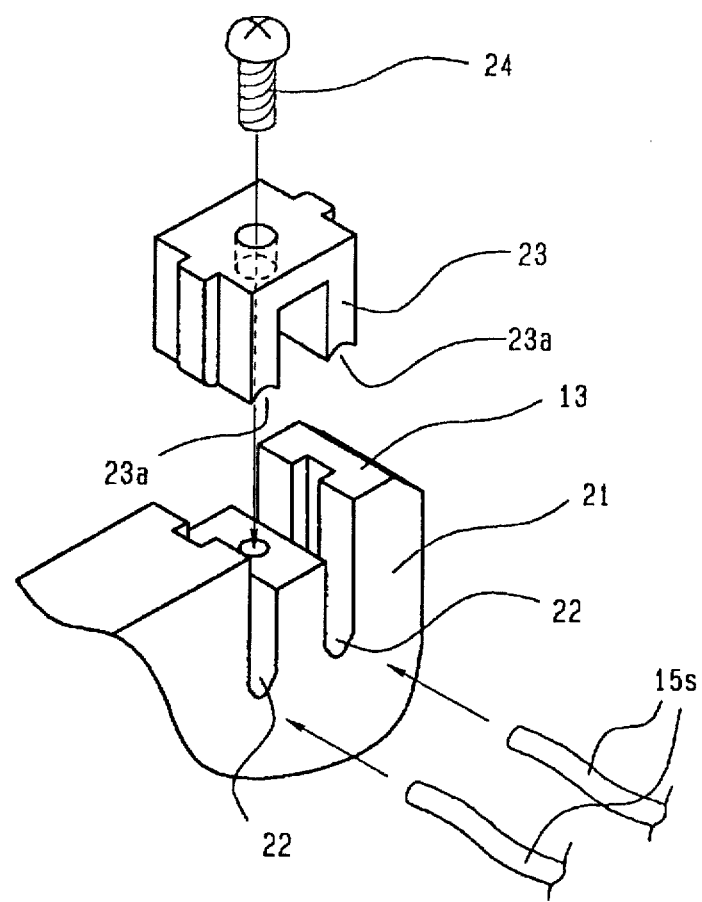
FIG. 4 is a perspective view of a waterproof structure for a lead wire of the magnetic head.

As shown in FIGS. 2 and 4, the lead wires 15s, 15s of the coils of the magnetic head 15 penetrate a water proofing portion 21 of the wall member 13. That is, the wall member 13 is formed with grooves 22, 22 in which the lead wires 15s, 15s extend, respectively, and a filler member 23, having an approximately n-shape having grooves 23a, 23a, made of the same plastic material or an elastic material is fitted into the grooves 22, 22 and fixed thereto by means of a screw 24, thereby holding the lead wires 15s, 15s. The grooves 23a, 23a of the filler member 23 each has an approximately semi-circular cross section having an inner diameter smaller than an outer diameter of the lead wire 15s, and accordingly, the invading of the foreign materials such as rain water, gasoline, fog, dust and the like from the outside of the card reader into the electronic circuit unit 7 through the lead wires 15s, 15s can be effectively prevented.

Hereunder, the discriminating means 25 for discriminating the presence of the magnetic card C and the block means 26 accommodating the discriminating means 25 for blocking water-tightly the same will be described.

Figure 5:
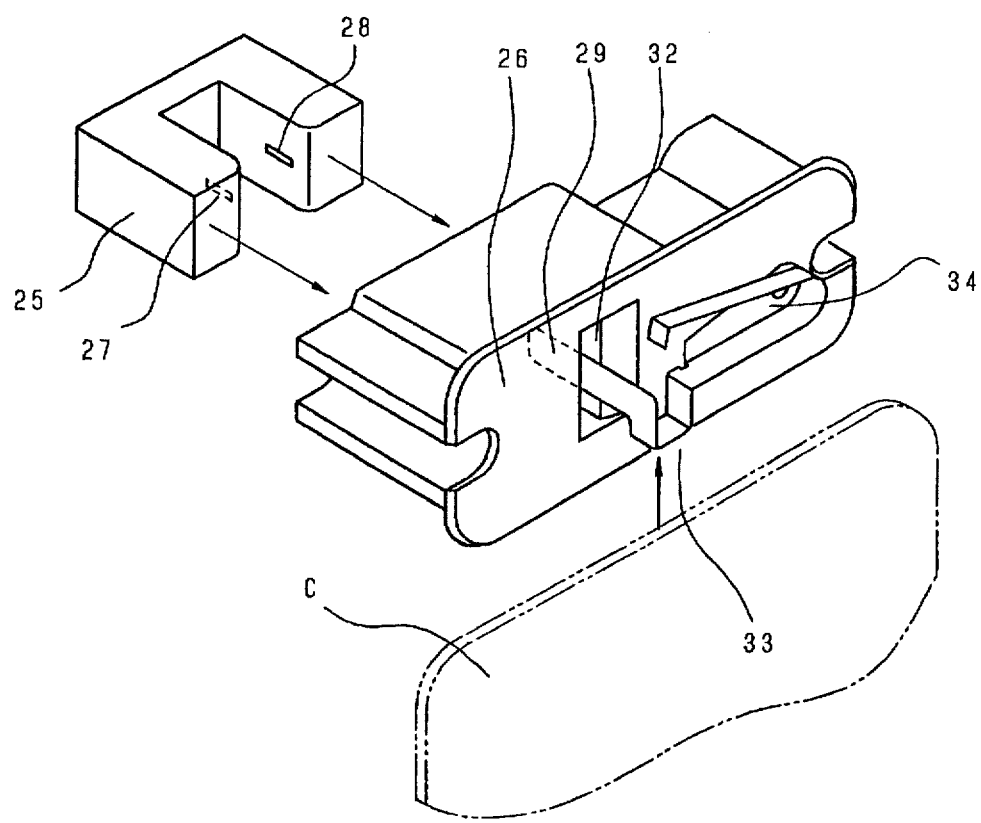
FIGS. 5 and 6 are perspective views of a waterproof structure for a discriminating means of the magnetic card reader of the first embodiment in a state of the card insertion completion.
Figure 6:
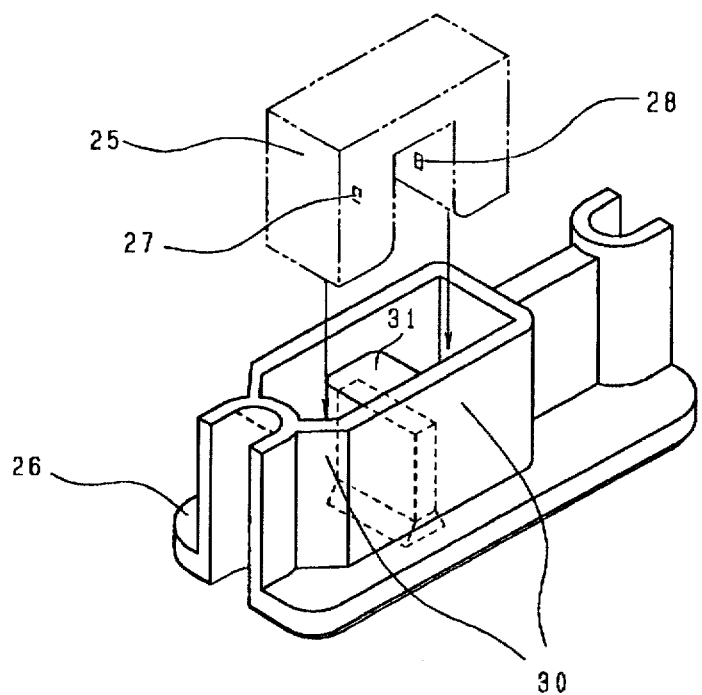
Figure 7:
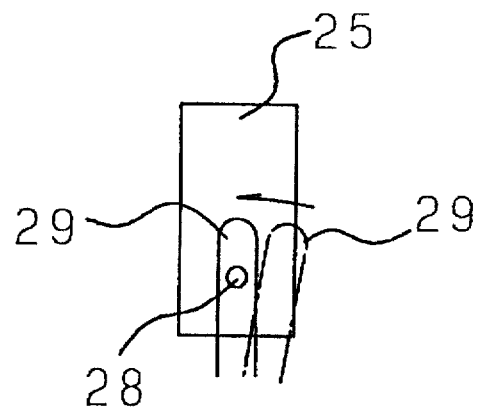
FIG. 7 is a view showing an ON-OFF switch for the discriminating means.

Referring to FIG. 2, the discriminating means 25 is disposed at a portion near the bottom portion 14b of the main body 9 of the magnetic card accommodation unit 6, the discriminating means 25 serving to discriminate whether the magnetic card C is completely inserted into the accommodation portion 14. The discriminating means 25 is, as shown in FIGS. 5 and 6, a photo-coupler provided with a light emitting element 27 and a light receiving element 28 and also provided with a light shielding member 29. The block means 26 has a vessel structure having small chambers 30, 30 for accommodating and water-tightly holding therein the discriminating means 25 comprising the above electronic elements, the block means 26 being formed preferably of a light transmissive material such as transparent or semi-transparent plastic material.

The block means 26 is, as shown in FIG. 2, detachably fixed to the main body 9 of the accommodation unit 6 and the electronic circuit substrate 7a through waterproof gaskets, not shown, and by means of screws 7b. The block means 26 is provided with the small chambers 30, 30 in which the discriminating means 25 is accommodated as shown in FIG. 6 and which are divided by a sectioning member 31 having a space 32 as shown in FIG. 5 in which the light shielding member 29 such as a metallic, for example, stainless, spring member is disposed. The light shielding member 32 has an abutment portion positioned the accommodation portion 14 as shown in FIG. 2.

The discriminating means 25 operates the following manner.

Since the block means 26 is formed as, for example, a transparent vessel like structure, the light from the light emitting element 27 reaches the light receiving element 28 through the sectioning member 31. When the magnetic card C is completely inserted into a predetermined position in the accommodation portion 14 and the front end of the magnetic card C abuts against the abutment portion 33, the light shielding member 29 is slightly rotated with a point 34 being the center of the rotation thereby to shut out the light from the light emitting element 27 as shown by the arrows in FIGS. 5 and 7. Then, because the light does not reach the light receiving element 28, the light receiving element 28 transmits a switching signal to the electronic circuit unit 7, which is then reset. The magnetic head 15 reads out the information recorded on the magnetic stripe CS of the magnetic card C and the read-out information is transferred to the electronic circuit unit 7.

According to the embodiment described above, since the space 32 communicating with the accommodation portion 14 is closed as shown in FIG. 5 by the sectioning member 31, the foreign materials such as rain water, gasoline, dust or the like invaded into the accommodation portion 14 does not leak outside the main body of the magnetic card accommodation unit 6. The invaded liquid substance merely contacts the light shielding member 29 of stainless structure in the accommodation portion 14 and does not invade into the small chambers 30, 30 of the block means 26, whereby the discriminating means 25 can be effectively shut out or isolated from such foreign substances.

As described above, although the magnetic card accommodation portion 14 is directly communicated with an external atmosphere through the magnetic card insertion port, according to the present invention, the card reader is disposed so that the magnetic card accommodation portion 14 is positioned to be directed slightly upward with respect to a horizontal plane HL as a preferred embodiment shown in FIGS. 1 to 8. In such preferred embodiment, since the electronic circuit unit 7 and the discriminating means 25 can be substantially completely shut out or isolated from the external atmosphere, even if the magnetic card reader is disposed so that the magnetic card accommodation portion 14 is directed slightly upward for easy insertion of the card, the foreign substance does not invade into the electronic circuit unit 7 and the discriminating means 25 because of any problem with to the electrical insulation.

Though not specifically shown, the card reader of the present invention may be positioned so as to be directed approximately perpendicularly with respect to the horizontal plane HL because of the same reason as that mentioned above.

As described above, by locating the card reader 5 so as to be directed upwardly with respect to the operation panel 2, it becomes possible to easily insert the magnetic card C into the insertion port of the card reader 5. That is, in comparison with the conventional structure in which the insertion port is directed downward for preventing the foreign substance from invading, according to the conventional structure, much time and labour is required for confirming the location of the magnetic card insertion port. In order to smoothly insert the magnetic card into the card reader through the insertion port, it is desired that the position of the insertion port is equal to or above the eye lines or level of a user.

According to the conventional card reader, if the card insertion port is positioned so as to accord with the eye lines of children or handicapped persons, it is not easy for a tall person to insert the magnetic card into the card insertion port, and furthermore, when an automatic vending machine provided with the card reader is settled to an entrance or exit of a toll road, it may be required to arrange several card readers having different location height positions for respective vehicles having various heights.

According to the card reader of the described embodiment of the present invention, however, the magnetic card insertion port of the card reader is provided so as to be directed upwardly, so that the magnetic card reader can be disposed at a desired portion such as a lower portion of the machine such as automatic vending machine as far as the portion is ready for access for the user. Thus the present card reader is applicable for various standing users and users seated in vehicles. In addition, since the magnetic head 15 shown in FIG. 2 is integrally provided with the main body 9, it can be easily handled and manufactured with reduced cost.

The protector cover member 10 has itself no auxiliary function for carrying out the insertion of the magnetic card C, and accordingly, the magnetic card C can be inserted into the main body of the card accommodation unit 6 to examine the function of the card C with the protector cover member 10 being removed.

The discriminating means 25 serving as the light switch is accommodated in the transmissive block means 26 having a waterproof property. Therefore, in addition to the improvement in the waterproofing function of the discriminating means 25, since it is possible to solder the discriminating means 25 to the back surface of the substrate 7a of the electronic circuit unit 7 and to assemble the discriminating means 25 with the block means 26 by disposing the discriminating means 25 in the small chambers of the block means 26 in the soldered state, any outer wiring in association with the discriminating means 25 is not required, thus improving the productivity and reducing the manufacturing cost. Furthermore, since a liquid substance such as water invaded into the magnetic card accommodation portion 14 never seeks into the discriminating means 25, it becomes possible to wash, with water, the accommodation portion 14 which is liable to be soiled.

Since the block means 26 can be disassembled by removing the screws 7b, if the sectioning member 31 of the block means 26 is soiled, it can be easily cleaned.

In places such as food shops in a department store, in general, it is known that the moisture is high and temperature varies widely, the temperature increases and the moisture also becomes high at night time or holidays in the summer season and an air conditioner is operated during the day time. Accordingly, a freezing phenomenon is repeatedly caused due to the dew point to the surface area of the magnetic card reader 5 and the electronic circuit unit connected to the external portion, thus causing severe damage. However, according to the present invention, the freezing phenomenon can be prevented from occurring by effecting the waterproof function and the dust-proof function to the outer surface of the equipment and the card reader 5 even under such a severe environmental condition.

Furthermore, in like manner, the automatic vending machine equipped with the card reader of the present invention is usable in coastal areas or on ships or the like, thus prolonging its usable life time, whereby the card reader of the above embodiment will be usable as a complete waterproof type manual magnetic card reader.

A second embodiment of the present invention will be described hereunder with reference to FIG. 8.

In this embodiment, a drain means 40 such as a hose is connected, as a liquid discharge means, to the main body 9 so as to communicate with the magnetic card accommodation portion 14. The other structure is substantially the same as that of the first embodiment, so that the detail thereof is omitted here.

According to this embodiment, the liquid such as rain water, snow or gasoline which has invaded into the accommodation portion 14 can be effectively discharged externally through the hose 40, so that the liquid does not stay therein.

If the liquid stays in the accommodation portion 14, the liquid will be frozen in a case where the magnetic card reader 5 is located in a cold area, and it becomes impossible to insert the magnetic card into the accommodation portion 14. Such trouble can be eliminated according to the second embodiment of the present invention.

Figure 9:
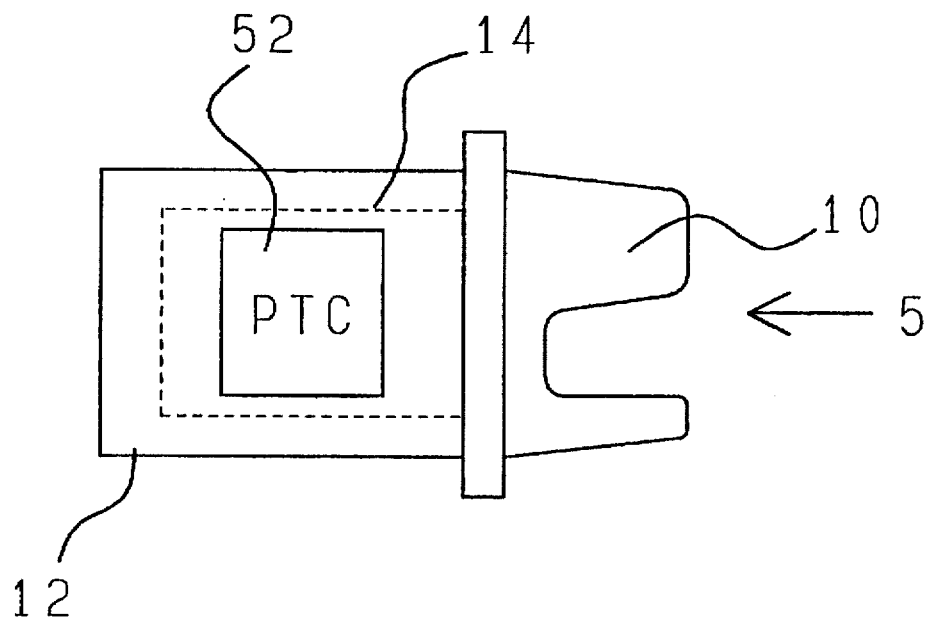
FIG. 9 is an illustrated side view of a third embodiment of the present invention which is equipped with a heating means in addition to the second embodiment.

A third embodiment of the present invention will be described hereunder with reference to FIG. 9.

In this third embodiment, a heating means 52 utilizing a semiconductor element is further arranged in the vicinity of the outer peripheral portion of the main body of the magnetic card accommodation unit 6 for preventing the interior of the accommodation portion 14 from freezing.

Figure 8:
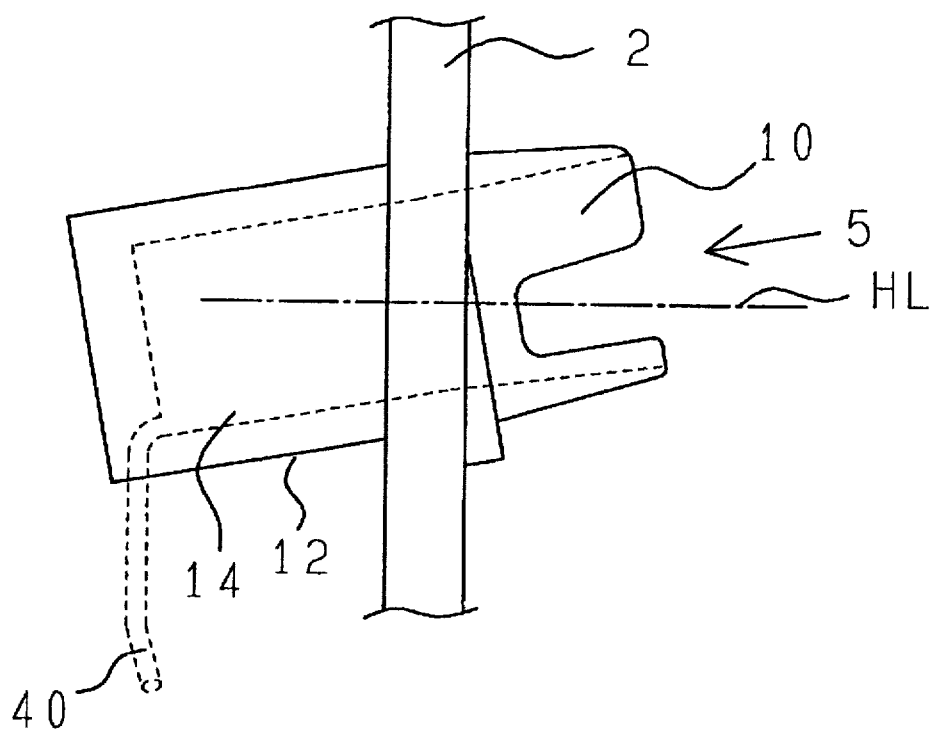
FIG. 8 is an illustrated side view of a magnetic card insertion port of a magnetic card reader according to a second embodiment of the present invention, in which the magnetic card reader is set so that the card insertion port is directed upward.

According to this embodiment, when the semiconductor heating means 52 is electrically conducted, the frozen substance is dissolved and the dissolved liquid is then discharged by the discharge means such as the hose 40 in FIG. 8. The semiconductor heating means 52 is operated by switching on at a time when the environmental temperature lowers to a temperature at which the liquid substance invaded into the accommodation guide 14 will be frozen, to thereby heat the inserted magnetic card C. As such semiconductor heating means 52, a heater provided with a positive characteristic thermister (PTC) will be preferably utilized. The other structure of the third embodiment is substantially the same as that of the first or second embodiment, so that the detail thereof are omitted here.

Figure 10:
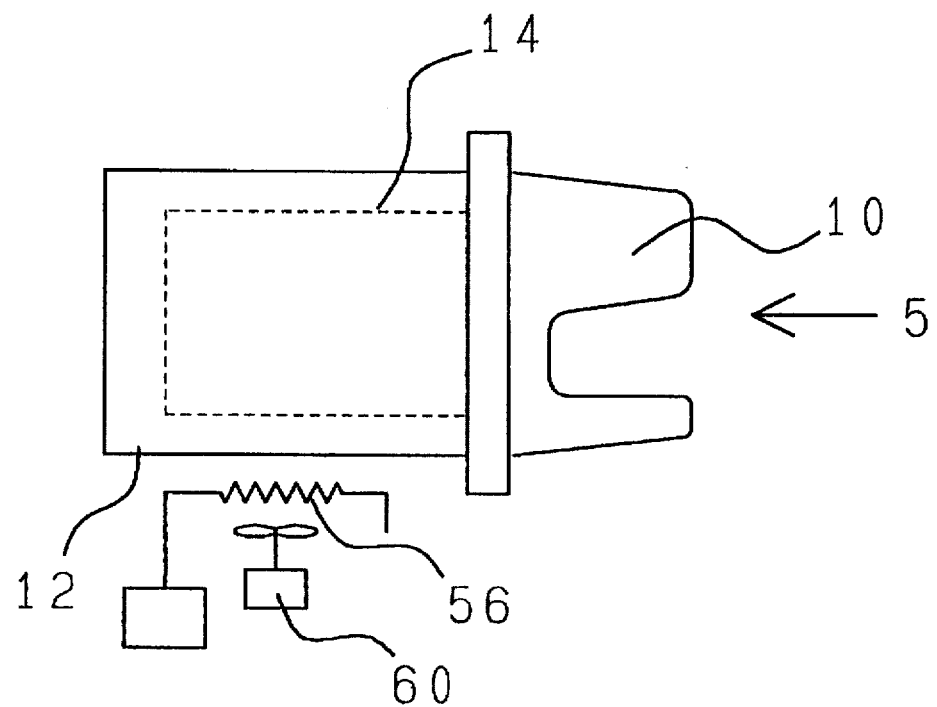
FIG. 10 is an illustrated side view of a fourth embodiment of the present invention which is equipped with another heating means in substitution for the heating means of the third embodiment.

A fourth embodiment of the present invention will be described hereunder with reference to FIG. 10.

In this fourth embodiment, a heater 56 is disposed in substitution for the semiconductor heating means 52 in the former third embodiment. The heater 56 is provided with a fan motor 60 and is disposed in the vicinity of the rear portion 12 of the main body 9 of the card accommodation unit 6. When the magnetic card reader 5 of this embodiment is utilized in a cold area, in order to effectively transfer the heat generated by the heater 56 to a frozen portion in the accommodation guide 14, it is desired to form the main body, the protector cover member 10 and the like of a material having a good thermal conductivity. The other structure of the third embodiment is substantially the same as that of the first or second embodiment, so that the detail thereof is omitted here. According to this embodiment, the foreign materials such as liquid substances and dust or the like can be prevented from freezing in the magnetic card reader as well as from invading thereinto, thus being advantageous for the location of the magnetic card readers in various areas or regions.

Figure 11:
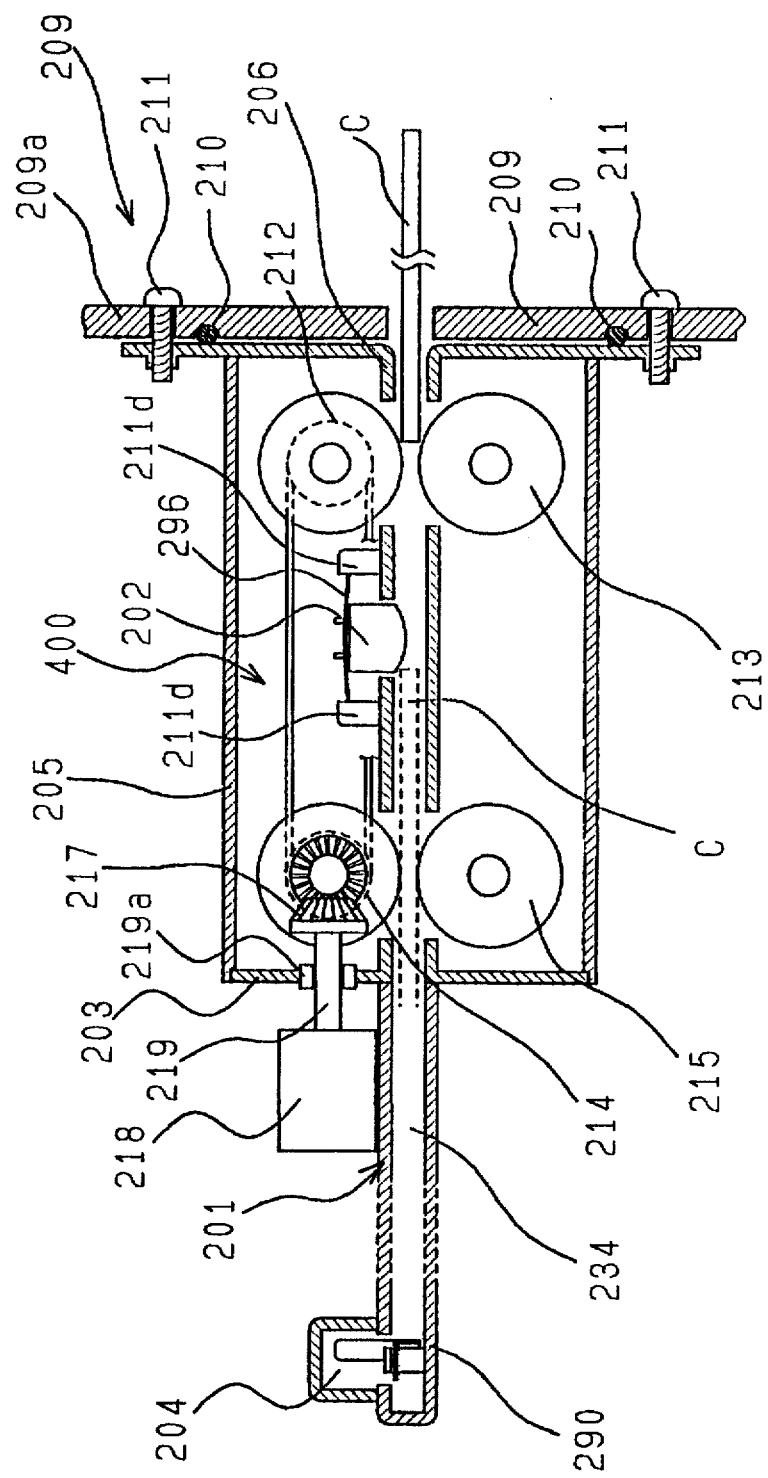
FIG. 11 is a side view of a magnetic card reader of a fifth embodiment of the present invention.

A fifth embodiment of the present invention will be described hereunder with reference to FIGS. 11 and 12.

This fifth embodiment provides a complete waterproof type magnetic card reader of the type driven by an electric motor. This embodiment differs mainly from the manual operation type magnetic card reader in that an electric motor 218 is incorporated for operation. When the motor 218 is driven, the magnetic card C is guided into or out from an accommodation portion 234 under the pressure of pinch rollers. The main structure 201 of the magnetic card reader is mounted to an operation panel 209a of an automatic vending machine 209 by means of screws 211, for example, through packings 210.

The accommodation portion 234 of the main structure 201 has a flat portion extending from its card insertion port 206 to the bottom portion 290. The magnetic head 202 is held by a pressing means 296 to support member 211d of the main structure 201 so that the sliding surface of the magnetic head 202 projects inside the accommodation portion 234. A discriminating means 204 of the structure identical to that of the first embodiment is arranged on the bottom portion 290, and the discriminating means 204 serves to detect the complete insertion of the magnetic card C into the accommodation portion 234 and to transmit a detection signal to an electronic circuit unit 267, to which a readout signal from the magnetic head 202 is also inputted.

A magnetic card driving mechanism 400 is also incorporated in the magnetic card reader of the fifth embodiment, and the magnetic card driving mechanism 400 comprises pinch rollers 212 and 214, rubber rollers 213 and 215, the magnetic head 202 and a bevel gear 217, which are accommodated in a casing 203 serving as a shutout block member. An output shaft 219 extends from the motor 218 and the bevel gear 217 is mounted on the output shaft 219, which is supported by a bearing means 219a to be rotatable. The pinch rollers 212 and 214 are driven in association with each other and the rubber rollers 213 and 215 facing these rollers serve to press the magnetic card C against the pinch rollers 212 and 214 by the deformation or elasticity of the rubber rollers.

Figure 12:
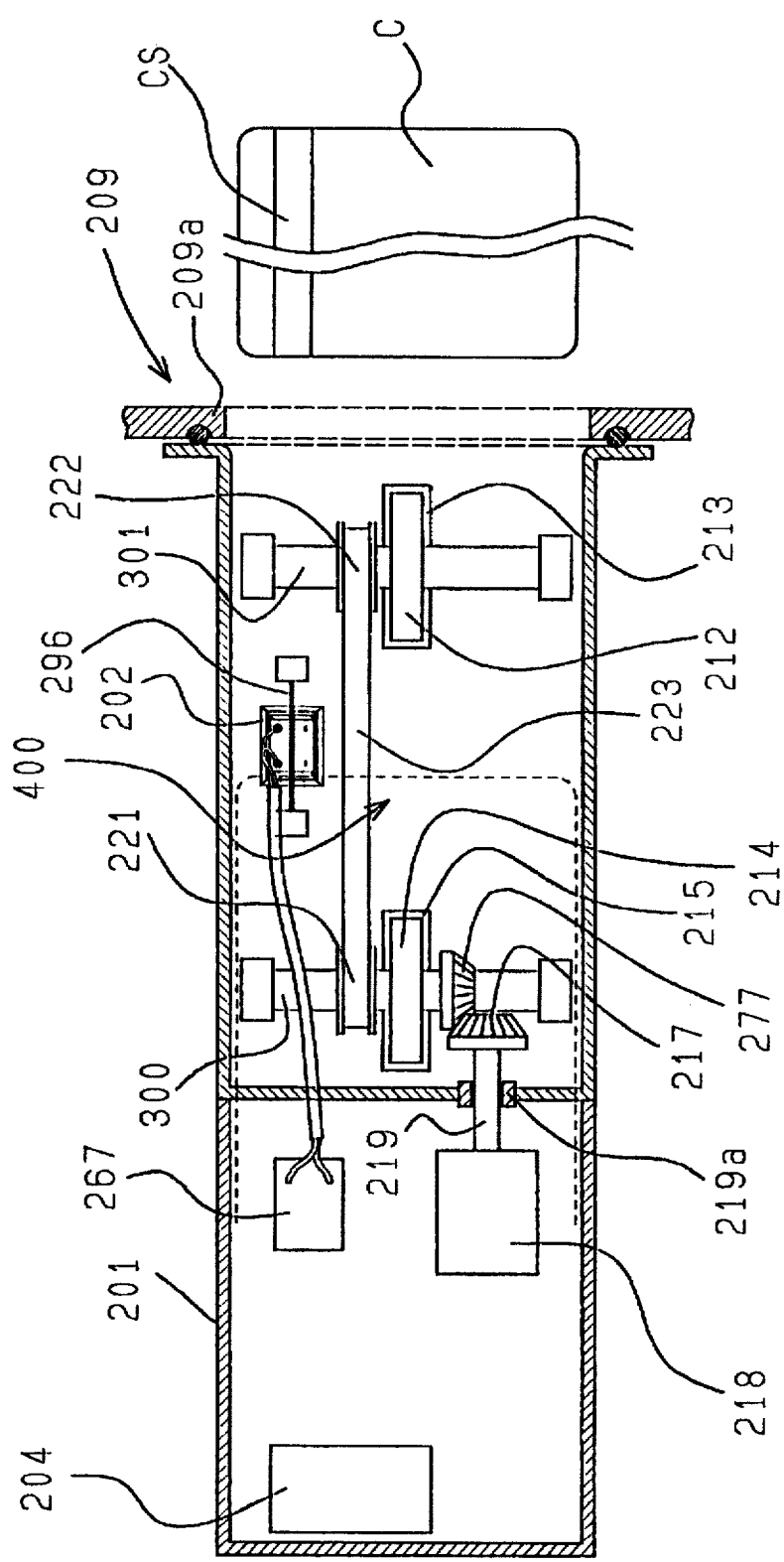
FIG. 12 is a plan view of the fifth embodiment.

As shown in FIG. 12, the bevel gear 217 is meshed with a gear 277, and shaft members 300 and 301 are rotated synchronously with each other by way of pulleys 221 and 222 and a wire 223. That is, two pinch rollers 214, the gear 277 and the pulley 221 are mounted to the shaft member 300, and two pinch rollers 212 and the pulley 222 are mounted on the other shaft member 301, and the pulleys 221 and 222 are connected through the wire 223. It is to be noted that there exists a gap in a portion in which the rollers are contacting the magnetic card C, and accordingly, the foreign substance such as rain water or the like invaded into the card accommodation portion 234 will also invade into the outside of the main structure 201. Then, it is desired to manufacture the respective elements or members constituting the driving mechanism 400 with materials having a water-proof property such as brass or stainless steel.

The output shaft 219 of the motor 218 may be constructed in the water-proof manner by, for example, locating the waterproof bearing means 219a or rubber packing means. Since the outer operation panel 209a of the automatic vending machine 209 is clamped through a packing 210 by means of screws 211, it will be not necessary to take further steps to water-proof the structure. When the magnetic card C is inserted into the accommodation portion 234 of the main structure 201, the magnetic head 202 detects the magnetic stripe CS of the card C and the motor 218 is then driven to synchronously rotate the shaft members 300 and 301 with each other.

According to these rotational motions of both the shaft members 300 and 301, the magnetic card C is automatically inserted and guided into the card accommodation portion 234 from the card insertion starting state shown by the solid line to the card insertion completion state shown by the broken line. At this state, the discriminating means 204 detects the insertion of the card C and transmits the detection signal for the completion of the insertion of the card C. Then, the motor 218 is driven reversely, and the magnetic card C is automatically discharged in the manner reverse to its insertion. During these operations, the magnetic card C is moved at the constant speed and the magnetic head 202 reads out the information recorded on the magnetic stripe CS of the card C.

There is a case that the magnetic card C reciprocates several times for the readout of the magnetic head 202. In such case, after a series of operations, the motor 218 stops at an instance when the magnetic card C is moved over the magnetic head 202 to stop the rotation of the rollers, and it is at this time necessary to stop the motor at an instance when the rollers slightly bite the magnetic card C for easy pull-out of the magnetic card by the hand of a user without forcibly discharging the card.

In the fifth embodiment, the magnetic card driving mechanism 400 is arranged in a manner isolated from the electronic circuit unit 267 including the motor 218 by providing a cover 205. Accordingly, the magnetic card reader of the fifth embodiment may be particularly useful for a case where it is disposed at a portion at which the card insertion port of the card reader is exposed to rain, wind or similar bad weather condition and a case where the card insertion port 206 is directed upward with respect to the horizontal plane. It will be desired to detect the insertion of the magnetic card by means of a light switch or the like means.

Figure 13:
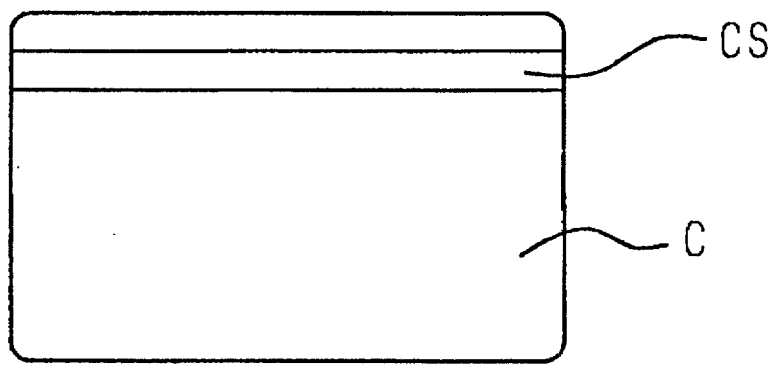
FIG. 13 shows one example of a full character card.
Figure 14:
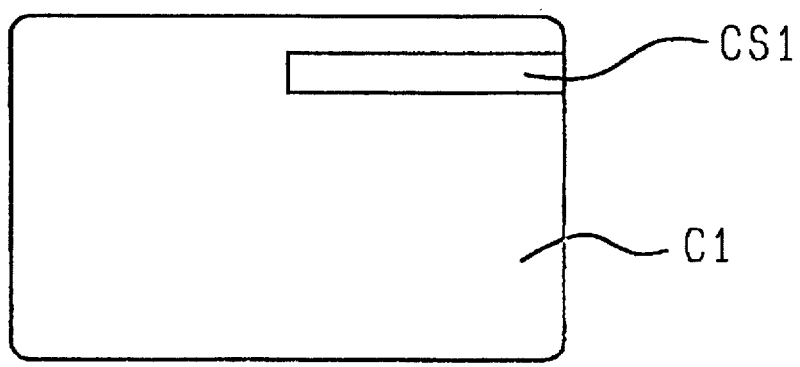
FIG. 14 shows one example of a half character card.
Figure 15:
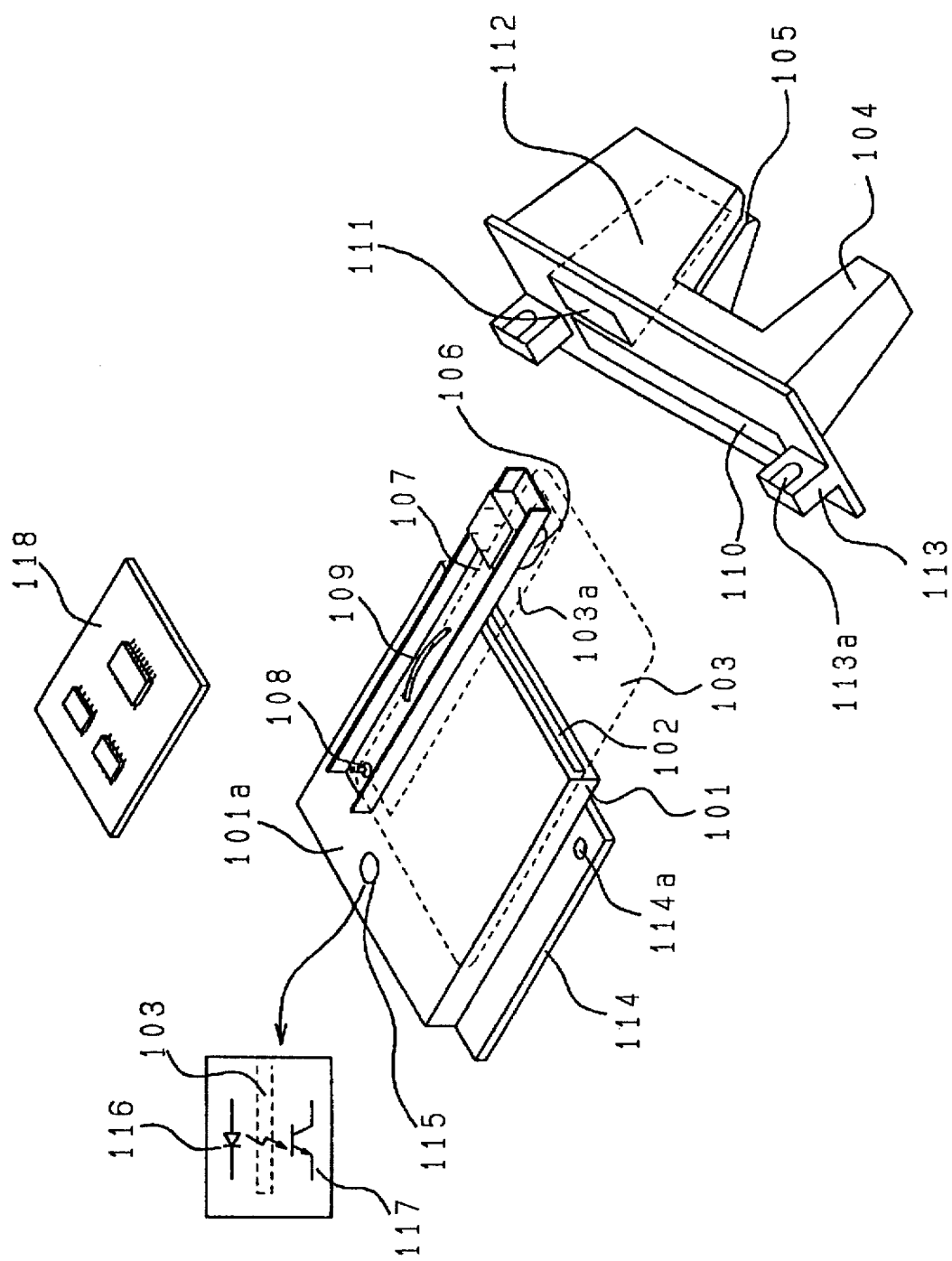
FIG. 15 is a developed perspective view of one example of a conventional magnetic card reader to be applicable to an automatic vending machine.

As a magnetic card C (C1), a full character card on which a magnetic stripe CS shown in FIG. 13 is formed along an entire longitudinal length thereof may be used, or a half character card on which a magnetic stripe CS1 as shown in FIG. 14 is formed along a half longitudinal length thereof may be also used.

According to the structures and characteristics of the present invention described above by way of preferred embodiments, since the shutout member is specifically provided for the magnetic card accommodation unit, foreign material such as a liquid substance which has invaded in the reading apparatus through the outside of the magnetic card accommodation unit can be prevented from reaching the electronic circuit unit, thus preventing the same from being damaged, and hence, accurately reading out the magnetic information recorded on the magnetic card.

According to the present invention, the insertion port for the magnetic card can be directed upward or provided at any portion of the outer structure of the automatic vending machine, for example, so as to be accessible to having different heights and be usable even by children or handicapped persons, or persons sitting in vehicles.

It is to be noted that the present invention is described hereinbefore with reference to the preferred embodiments, but the present invention is not limited to these embodiments and many other changes or modifications, or combinations, may be made without departing from the scope of the appended claims.

What is claimed is:

1. A magnetic card reading apparatus comprising:
   a main structure; and
   an outer structure coupled to the main structure,
   said main structure comprising:
   a magnetic card accommodation unit operative to accommodate a magnetic card in a predetermined position and provided with a magnetic card insertion port and a magnetic card accommodation portion communicated with the magnetic card insertion port;
   means, provided with the magnetic card accommodation unit, for reading out a magnetic information recorded on the magnetic card held at the predetermined position;
   an electronic circuit unit provided with the magnetic card accommodation unit for processing a signal concerning the information read out by and transmitted from the readout means; and
   a sealing mechanism provided with the magnetic card accommodation unit, comprising:
   a first sealing member for preventing a foreign material from leaking from the magnetic card insertion port into the card accommodation portion;
   a second sealing member formed with grooves and fastened to said outer structure;
   a third sealing member for sealingly separating the electronic circuit unit from the foreign material; and
   a fourth sealing member for preventing the foreign material from invading from the magnetic readout means into the card accommodation portion along lead wires.

2. A magnetic card reading apparatus according to claim 1, wherein the magnetic card readout means is disposed in a vicinity of the magnetic card insertion port and is provided with a pressing means for pressing the readout means against the magnetic card inserted.

3. A magnetic card reading apparatus according to claim 1, wherein the magnetic card readout means comprises a magnetic head having a contacting portion for contacting the magnetic card, said contacting portion being formed with a thin titanium plate.

4. A magnetic card reading apparatus according to claim 1, wherein the second sealing member comprises a wall member fastenable to the outer structure, and the third sealing member is operative to seal the electronic circuit unit of the main structure from foreign material.

5. A magnetic card reading apparatus according to claim 4, wherein said third seal member is formed from a rubber seal plate.

6. A magnetic card reading apparatus according to claim 1, wherein said magnetic card accommodation unit has a main body provided with a front portion to which the magnetic card readout means is mounted, a rear portion to which the electronic circuit unit is mounted and a flanged portion constructed as wall member portion common to a wall portion of the sealing mechanism.

7. A magnetic card reading apparatus according to claim 1, wherein said main structure further comprises a discriminating means for discriminating a fact that the magnetic card is completely accommodated in a predetermined position of the magnetic card accommodation unit and a block means for accommodating the discriminating means and blocking the foreign material invaded into the magnetic card reading apparatus through the magnetic card insertion port from reaching the discriminating means.

8. A magnetic card reading apparatus according to claim 7, wherein said discriminating means and said block means are disposed at a rear end portion of a magnetic card accommodation portion of the magnetic card accommodation unit.

9. A magnetic card reading apparatus according to claim 8, wherein said discriminating means comprises a light emitting member, a light receiving element and a light shielding element.

10. A magnetic card reading apparatus according to claim 8, wherein said block means has a vessel structure operative to accommodate the discriminating means and is made of a light transmissive material.

11. A magnetic card reading apparatus according to claim 10, wherein said block means is detachably fixed to the main body of said magnetic card accommodation unit and the electronic circuit unit.

12. A magnetic card reading apparatus according to claim 10, wherein said block means further comprises a sectioning member having a space in which a light-shielding member is disposed, said sectioning member sealing said space and preventing foreign material from invading the chambers of the block means and the magnetic card accommodation portion.

13. A magnetic card reading apparatus according to claim 9, wherein said light-shielding member further comprises an abutment portion positioned in the magnetic card accommodation portion, against which the magnetic card is abutted upon complete insertion of the magnetic card in a predetermined position, said light-shielding member operative to rotate and prevent light from the light emitting element from being transmitted.

14. A magnetic card reading apparatus according to claim 1, wherein said outer structure is a protector cover member attached to the main structure for covering the same.

15. A magnetic card reading apparatus according to claim 14, wherein said protector cover member comprises an opening port communicated with the magnetic card insertion port and a portion covering a front end portion of the magnetic card accommodation unit.

16. A magnetic card reading apparatus according to claim 1, wherein the magnetic card insertion port is directed obliquely upward with an inclination with respect to a horizontal plane.

17. A magnetic card reading apparatus according to claim 1, wherein the magnetic card insertion port is directed substantially perpendicularly upward with respect to a horizontal plane.

18. A magnetic card reading apparatus according to claim 1, wherein a drain means is connected to the magnetic card accommodation unit to drain liquid substance invaded thereinto outside the apparatus.

19. A magnetic card reading apparatus according to claim 1, wherein a heating means is provided for the magnetic card accommodation unit to heat the same.

20. A magnetic card reading apparatus according to claim 19, wherein the magnetic card accommodation unit is formed of a material thermally conductive.

21. A magnetic card reading apparatus according to claim 1, wherein said magnetic card accommodation unit is further provided with a driving mechanism operative to pull the magnetic card into the magnetic card accommodation unit through the insertion port, to locate the magnetic card to a predetermined position in the magnetic card accommodation unit and to discharge the magnetic card in the magnetic card accommodation unit outside the same through the insertion port.

22. A magnetic card reading apparatus comprising:
a main structure; and
a protective cover member detachably mounted to the main structure,
said main structure comprising:
a magnetic card accommodation unit operative to accommodate a magnetic card in a predetermined position and provided with a magnetic card insertion port and a magnetic card accommodation portion communicated with the magnetic card insertion port;
means, provided with the magnetic card accommodation unit, for reading out a magnetic information recorded on the magnetic card held at the predetermined position;
an electronic circuit unit provided for the magnetic card accommodation unit for processing a signal concerning the information read out by and transmitted from the readout means;
means for discriminating a fact that the magnetic card is completely accommodated in a predetermined position of the magnetic card accommodation unit; and
a sealing mechanism provided with the magnetic card accommodation unit, comprising:
a holder-type front portion comprising the magnetic card insertion port having a magnetic head thereon;
a wall member formed with grooves and fastened to the protective cover member;
a seal member for sealingly separating an inner space in which the electronic circuit unit is disposed, from a foreign material; and
a water-proofing portion of said wall member wherein lead wires extending from coils of the magnetic head are extended within said grooves of said wall member and sealingly guided and held.

23. A magnetic card reading apparatus according to claim 22, wherein said water-proofing portion further comprises a filler member having an approximately n-shape and having grooves, said filler member being fitted in said grooves of said wall member and fastened thereto, thereby holding said lead wires.

24. A magnetic card reading apparatus according to claim 23, wherein said filler member is made of at least one of a plastic or an elastic material.

25. A magnetic card reading apparatus according to claim 24, wherein said grooves of said filler member each have an approximately semi-circular cross-section having an inner diameter smaller than an outer diameter of a single lead wire.

26. A magnetic card reading apparatus according to claim 22, further comprising means for blocking light from a light emitting element, said block means having a vessel structure with chambers for accommodating and sealingly holding the discriminating means, wherein said block means is formed of a light transmissive material.

27. A magnetic card reading apparatus according to claim 26, wherein said block means is detachably fixed to the main body of said magnetic card accommodation unit and the electronic circuit unit.

28. A magnetic card reading apparatus according to claim 27, wherein said block means further comprises a sectioning member having a space in which a light-shielding member is disposed, said sectioning member sealing said space and preventing foreign material from invading the chambers of the block means and the magnetic card accommodation portion.

29. A magnetic card reading apparatus according to claim 28, wherein said light-shielding member further comprises an abutment portion positioned in the magnetic card accommodation portion, against which the magnetic card is abutted upon complete insertion of the magnetic card in a predetermined position, said light-shielding member operative to rotate and prevent light from the light emitting element from being transmitted.

30. A magnetic card reading apparatus according to claim 22, wherein the magnetic card accommodation unit further comprises a main body having a front portion to which the readout means is mounted, a rear portion to which the electronic circuit unit is mounted, and a flanged portion which constitutes a common wall portion of the sealing mechanism.

31. A magnetic card reading apparatus according to claim 22, wherein said readout means comprises a magnetic head having a contacting portion for contacting the magnetic card, said contacting portion being formed with a thin titanium plate.

32. A magnetic card reading apparatus according to claim 22, wherein said discriminating means is disposed at a rear end portion of the magnetic card accommodation portion of the magnetic card accommodation unit.

33. A magnetic card reading apparatus according to claim 32, wherein said discriminating means comprises a light emitting element, a light receiving element, and a light-shielding member.

34. A magnetic card reading apparatus comprising:

a main structure; and a protective cover detachably mounted to the main structure;

said main structure comprising:

- a magnetic card accommodation unit operative to accommodate a magnetic card in a predetermined position and provided with a magnetic card insertion port and a magnetic card accommodation portion communicated with the magnetic card insertion port; said magnetic card accommodation unit further including a main body formed of a synthetic thermally conductive material and having a front portion, a rear portion, and a flanged portion;
- a magnetic head mounted on a portion of the front portion of said main body, and constituting a magnetic information read-out element for reading out magnetic information on a magnetic card;
- a discriminating device disposed at a rear end portion of the magnetic card accommodation portion of the magnetic card accommodation unit, for discriminating a fact that the magnetic card is completely accommodated in a predetermined position of the magnetic card accommodation unit, said discriminating device comprising a light emitting element, a light receiving element, and a light-shielding member;

an electronic circuit unit mounted on the rear portion of the main body, and provided with the magnetic card accommodation unit for processing a signal concerning the information read out by and transmitted from the magnetic information read-out element;

a sealing mechanism provided with the magnetic card accommodation unit, comprising:

- a holder-type front portion comprising the magnetic card insertion port having the magnetic head thereon;
- a wall member forming a common wall portion with said flanged portion of said main body, said wall member being formed with grooves and fastened to the protective cover member;
- a seal member for sealingly separating an inner space in which the electronic circuit unit is disposed, from the foreign material;
- a water-proofing portion of said wall member wherein lead wires extending from coils of the magnetic head are extended within said grooves of said wall member and sealingly guided and held; and means for blocking light from the light emitting element of the discriminating means, said blocking means having a vessel structure with chambers for accommodating and sealingly holding the discriminating means, wherein said blocking means is formed of a light transmissive material.

* * * * *